United States Patent [19]

Berkowitz et al.

[11] Patent Number: 5,059,432

[45] Date of Patent: Oct. 22, 1991

[54] LEAVENED BREADS WITH EXTENDED SHELF LIFE

[75] Inventors: Daniel Berkowitz, Wellesley; Lauren E. Oleksyk, Natick, both of Mass.

[73] Assignee: The United States of America as represented by the Secretary of the Army, Washington, D.C.

[21] Appl. No.: 607,406

[22] Filed: Oct. 11, 1990

[51] Int. Cl.$^5$ .............................................. A21D 2/08
[52] U.S. Cl. ....................................... 426/19; 426/24; 426/62
[58] Field of Search ............................. 426/19, 24, 62

[56] References Cited

U.S. PATENT DOCUMENTS 4,456,625  6/1984  Durst .................................... 426/106
4,511,585  4/1985  Durst .................................... 426/106
4,937,086  6/1990  Prosise ............................. 426/19 X

FOREIGN PATENT DOCUMENTS

WO90/0000-08  1/1990  World Int. Prop. O. .

OTHER PUBLICATIONS

Breyer et al., Comparative Effects of Various Sucrose Fatty Acid Esters Upon Bread and Cookies, Journal of Food Science, vol. 48 (1986), pp. 955-958, 987.

Primary Examiner—Joseph Golian
Attorney, Agent, or Firm—Richard J. Donahue

[57] ABSTRACT

The shelf life of a bakery product is extended by including in the dough mixture, from which such product is formed, both a sucrose ester emulsifier and polyvinylpyrrolidone synthetic hydrocolloid. The storage characteristics of the product may be additionally improved by controlling water activity through the use of a alcohol in the proper quantity. Shelf life is further enhanced by minimizing the residual oxygen in the container in which the product is packaged.

6 Claims, 3 Drawing Sheets

LEAVENED BREADS WITH EXTENDED SHELF LIFE

STATEMENT OF GOVERNMENT INTEREST

The invention described herein may be manufactured, used and licensed by or for the Government for Governmental purposes without the payment to us of any royalty thereon.

BACKGROUND OF THE INVENTION

1. Field of the Invention

The present invention relates to enhancing the shelf life of bakery products and particularly to the production of breads which are stable under conditions of lengthy storage More specifically, the present invention is directed to dough formulations which prevent the hardening of the bread crumb while simultaneously reducing browning of stored bakery products produced from such dough formulations. Accordingly, the general objects of the present invention are to provide novel and improved methods and formulations of such character.

2. Description of the Prior Art

Bread, while consumed worldwide and considered an essential food item in most societies, is not a stable product. Thus, bread rapidly loses those desirable texture and flavor qualities associated with freshness. Conventional lean breads, such as French or Italian loaves, stale significantly within twenty-four hours. Enriched breads, such as the familiar mass-produced, slice wrapped white breads, have shelf lives of about five days. It has been estimated that international bread industry dollar losses due to staling are in the range of one billion dollars per year. Additionally, the short shelf life of commercial breads has resulted in the need for the baking industry to create and maintain production and distribution systems that operate within the limited window of saleability proscribed by the staling phenomena.

In order to reduce the losses resulting from staling, cereal chemists have done considerable research pursuant to efforts to extend the shelf life of breads This research is reported in numerous technical papers and includes use of preservatives, the reduction of package oxygen, the reduction of water activity and acidification. These previously proposed approaches to enhancement of bread shelf life have included such diverse techniques as controlled atmospheric packaging and the incorporation in the bread dough of additives which inhibit enzymatic and non-enzymatic browning The previously reported techniques have exhibited only limited success.

Experience has shown that both the health and morale of soldiers subsisting under field conditions is enhanced by the availability of satisfactory bread, i.e., bread which is neither stale nor discolored. The staling phenomena has greatly impeded the ability of the military services to provide breads to troops in the field where the establishment of field bakeries or their operation is not feasible Despite growing technical and scientific understanding of the staling phenomena, satisfactory shelf stable breads have heretofore eluded technical development for general consumption and for military use in particular. Military use demands the availability of truly shelf stable breads that retain satisfactory sensory and quality attributes for at least six months at 100° F. and two years at 70° F.

SUMMARY OF THE INVENTION

The present invention overcomes the above-discussed and other deficiencies and disadvantages by providing a method for the production of breads which are stable under conditions of lengthy storage which may be at adverse temperatures While not limited thereto in its utility, a bread in accordance with the present invention may be a white bread produced by either the straight or sponge dough method.

In accordance with the preferred embodiment of the present invention, in combination, a sucrose ester emulsifier, and a synthetic hydrocolloid salt of polyvinylpyrrolidone (hereinafter PVP) are incorporated in a conventional bread dough. By employing these additives in the proper proportions to one another and in the proper amounts by weight to the remaining constituents of a bread dough, potentially hazardous microorganisms are inhibited by controlling the water activity (Aw) to maintain such activity in the range below 0.95 and preferably below 0.91. In addition, non-enzymatic browning is reduced and hardening of the bread crumb (staling) is inhibited. The reduction of non-enzymatic browning may be further reduced, in accordance with the invention, by controlling both the levels and types of sugars employed in the dough.

BRIEF DESCRIPTION OF THE DRAWINGS

The present invention may be better understood by reference to the accompanying drawings which demonstrate the following.

DESCRIPTION OF THE PREFERRED EMBODIMENTS

Figure 1:
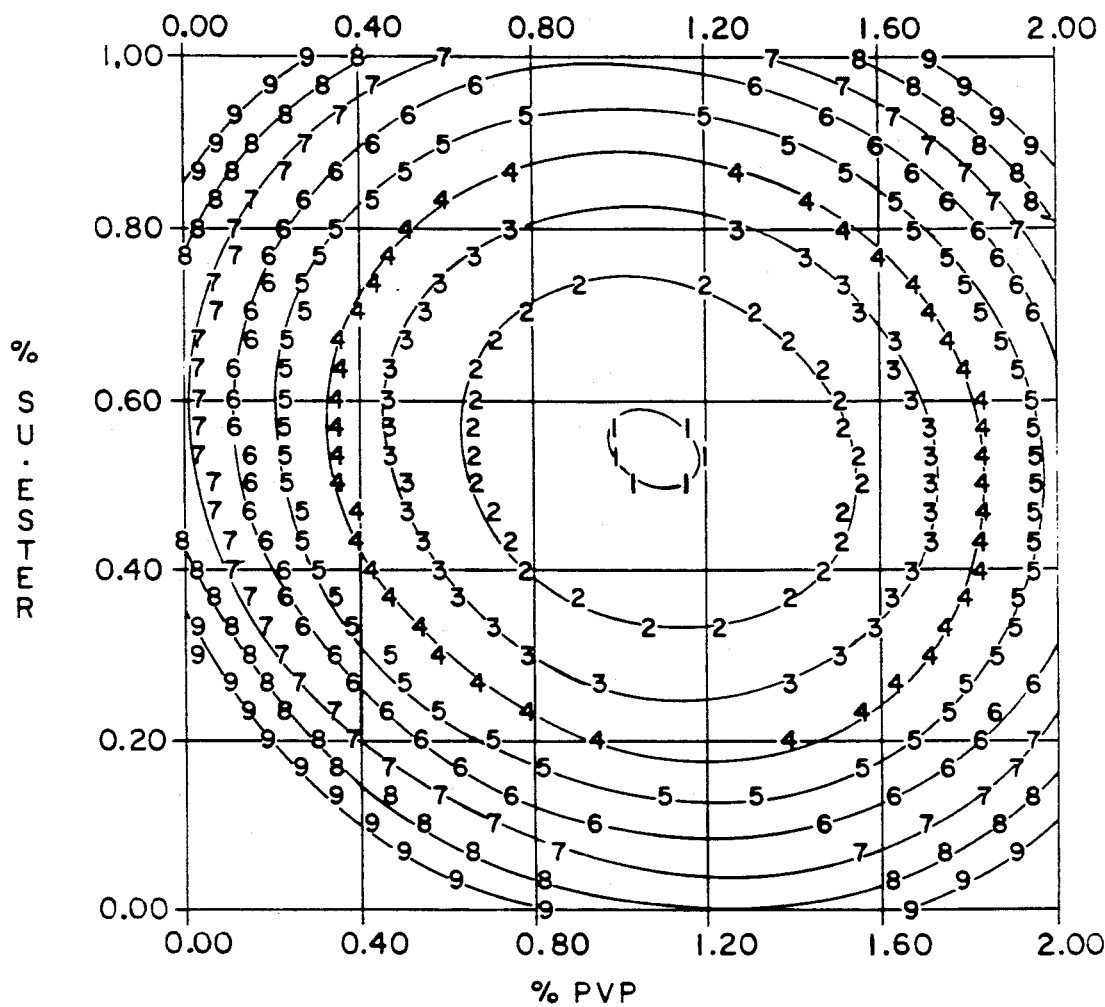
FIG. 1 is a graphical showing of the effect of the present invention on bread firmness.

In order to facilitate understanding of the invention, representative dough formulations in accordance with the invention will first be detailed:

EXAMPLE I

Bread intended for storage at a temperature not exceeding 70° F. in accordance with the present invention was prepared from the following:

| Ingredient | Percent by Weight |
|---|---|
| Flour, High gluten | 49.68 |
| Water | 28.50 |
| Shortening, vegetable | 8.55 |
| Glycerol | 6.00 |
| Sugar | 2.00 |
| Yeast, Instant, Dry | 1.90 |
| Salt | 1.29 |
| Sucrose Ester Emulsifier | 1.00 |
| Polyvinylpyrrolidone | 1.00 |
| Potassium Sorbate | 0.05 |
| Cream Flavor | 0.03 |

EXAMPLE II

Bread intended for storage at a temperature not exceeding 100° F. in accordance with the present invention was prepared from the following:

| Ingredient | Percent by Weight |
| --- | --- |
| Flour, High Gluten | 51.03 |
| Water | 29.15 |
| Shortening | 8.55 |
| Glycerol | 6.00 |
| Yeast, Instant, Dry | 1.90 |
| Salt | 1.29 |
| Sucrose, Ester Emulsifier | 1.00 |
| Polyvinylpyrrolidone | 1.00 |
| Potassium Sorbate | 0.05 |
| Cream Flavor | 0.03 |

Referring to the above examples, the Aw of the bread is adjusted, to within the range of 0.70 to 0.95 but preferably to 0.91 or below, by the incorporation of a alcohol, particularly glycerol. As alternatives to glycerol, or in combination therewith, sorbitol, maltitol and xylitol may be employed. In the case of bread which will be stored at temperatures which do not exceed 70° F., non-enzymatic browning is controlled by limiting the included sugars to sucrose in an amount not exceeding two percent (2%) by weight. If the storage conditions are to exceed 70° F. for an extended period of time, the dough does not contain any sugar.

Prevention of staling of a bread produced in accordance with the present invention is believed to be a function of the wheat starch amylose complexing and water stabilization effects of the combination of a sucrose ester emulsifier and PVP synthetic hydrocolloid. In both of the above examples, the sucrose ester emulsifier and PVP are included in the same amounts, i.e., one percent (1%) by weight of the dough formula. Particularly good results have been obtained employing sucrose stearate fatty ester emulsifiers having hydrophyllic/lypophyllic balance (HLB) numbers of 15 to 16. Such emulsifiers are, for example, available from Mitsubishi International Corp. under product numbers S1570 and S1670. The PVP employed in the practice of the invention will typically have a molecular weight of at least 300,000 and may, for example, be the product sold by BASF of Parsippany, New Jersey under the name "Kollidon" or the product sold by GAF Corporation of Wayne, New Jersey under the name "Plasdone" type PVK K-90.

The shelf life of a bread produced in accordance with the present invention may be enhanced by reduction of inter-package oxygen concentration which, in part, is a function of the temperature of the bread at the time it is packaged. Inter-package oxygen concentration may be reduced by inducing a vacuum within the package and/or by the inclusion of oxygen scavenging packets prior to sealing the bread in a container which is both oxygen and moisture impermeable. Such a container may, for example, be a flexible high barrier plastic or foil laminated pouch or a metal can.

In practice, bread dough in accordance with the invention may be prepared by either of the straight or sponge dough methods, may be formed into buns or rolls, mini or conventionally sized loaves, then baked, and subsequently packaged as discussed above. The requisite shelf life demands that the residual oxygen be reduced to at least 1.6% but preferably to 0.2% or less in the sealed container. Thus, if the breads are to be sealed in flexible pouches, it has been found desirable to perform the packaging with the bread at a temperature in the range of 120°-160° F. in order to obtain a partial vacuum resulting from condensation of steam occurring when the sealed bread cools to ambient temperature. Sufficient oxygen reduction may also be achieved in packaged bread which has already cooled to ambient temperature by the inclusion, in the sealed package, of an oxygen scavenger material that has the capability of chemically absorbing the oxygen content of residual air to a final concentration of 0.2% or less. The combined effect of partial vacuum due to sealing at about 140° F. and inclusion of an oxygen scavenger packet also may be employed to assure little or no residual oxygen within the packaged bread. Alternatively, the bread dough, properly fermented in rigid metal cans, may be baked and subsequently hermetically sealed in those cans before the bread internal temperature falls below 180° F. In such case, since significant vacuum is achieved, no oxygen scavenger may be required.

Figure 2:
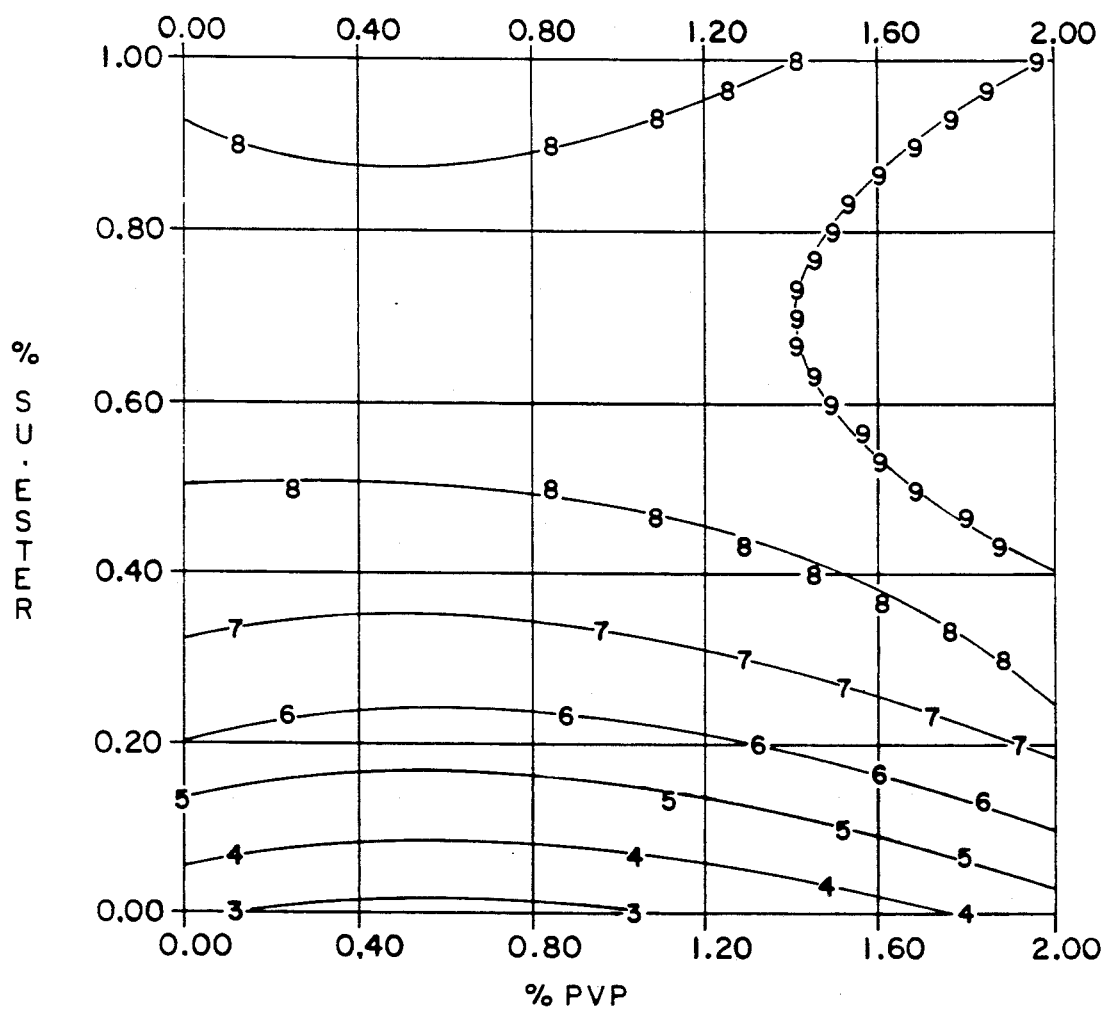
FIG. 2 is a graphical representation of the effect on bread whiteness resulting from practice of the present invention.
Figure 3:
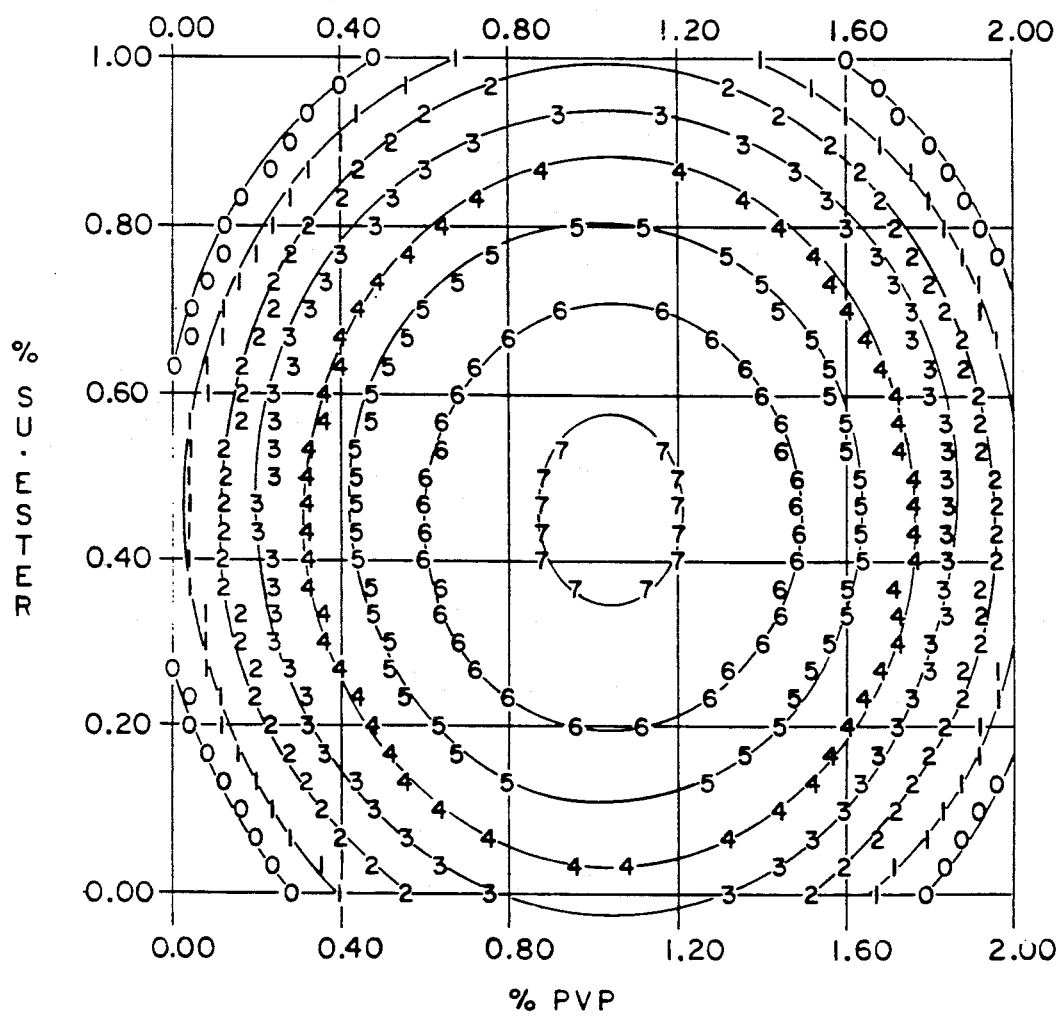
FIG. 3 is a graphical depiction of the bread loaf specific volume resulting from practice of the present invention.

While the two above-stated examples of a bread dough in accordance with the present invention show the use of both a sucrose stearate polyester emulsifier and PVP in amounts which are one percent by weight of the dough mixture, experiments have shown that the sucrose ester emulsifier may be present in levels from a trace up to one (1.0%) percent while the PVP may be present in levels in the range of one half to two (0.5%-2.0%) percent by weight As the total percent by weight of the combined PVP and sucrose ester emulsifier varies above and below two (2%) percent, the flour content of the dough mixture will be adjusted while the amounts of the other constituents of the mixture will be held constant The results on bread firmness, whiteness and specific volume for a loaf of bread in accordance with the present invention which has been stored for four weeks at 100° F. are respectively depicted in FIGS. 1, 2 and 3. Restated, FIGS. 1, 2 and 3 show the effects, on three parameters considered important by consumers, of varying the proportion of emulsifier and PVP within the above-stated ranges. In the case of FIG. 1, where it will be understood that the lower the value of firmness the more desirable the product, firmness was measured by a Voland-Stevens-LFRA analyzer. FIG. 1 shows that best results were obtained when the PVP was in the range of 0.85 to 1.20 percent by weight and the sucrose ester emulsifier was present in the range of approximately 0.5 to 0.6 percent by weight.

FIG. 2 shows the effect on whiteness of varying the PVP and sucrose ester emulsifier content. In the case of FIG. 2, the highest whiteness number represents the most desirable product and it may be seen that the greatest whiteness results when the sucrose ester emulsifier is in the range of approximately 0.4 to 1.0 percent by weight and the PVP concentration is in the range of approximately 1.4 to 2.0 percent by weight. Whiteness was measured by a "Spectroguard" color system manufactured by Pacific Scientific Instruments, Inc.

The specific volume of the bread is important because it indicates the efficacy of the blend of sucrose esters and PVP in lowering density (increasing volume) and increasing bread softness. FIG. 3 shows that the greatest specific volume, measured by an United States Army developed instrument which measures volume by displacement of very uniform oil seeds, is achieved when the PVP is present in the range of approximately 0.8 to 1.2 percent by weight and the sucrose ester emulsifier is present in the range of approximately 0.35 to 0.55 percent by weight.

To summarize the above discussion, it has been found that the combination of a sucrose ester emulsifier and polyvinylpyrrolidone hydrocolloid, when included in a bread dough, results in a bakery product having significantly extended shelf life. Particularly, texture retention is enhanced. i.e., crumb hardening or staling is significantly inhibited. It is believed that this improvement in texture retention may be due to the water stabilization i.e., water binding, effects of the PVP and particularly the chemical binding to the hydrocolloid of those ingredients in the dough which would otherwise cause browning. Additionally, color, namely whiteness, retention is greatly improved. It is believed that this improvement in long-term color retention may be due to the chemical complexing ability of the PVP. Additionally, as a totally unexpected side result, indicated by FIG. 3, the baked loaf volume is greatly improved. The improvement in specific volume may be due to protein strengthening effects of the PVP. Further, and most surprising, those beneficial effects discussed above which are believed to be due to the use of PVP are significantly enhanced by the combination of PVP with a sucrose ester which, in the preferred embodiment, is a sucrose stearate fatty acid ester emulsifier.

While preferred embodiments have been described, various modifications and substitutions may be made thereto without departing from the spirit and scope of the invention. Accordingly, it is to be understood that the present invention has been described by way of illustration and not limitation.

What is claimed is:

1. A method for improving the shelf life of a yeast leavened bakery product comprising the step of adding, to a dough mixture, a sucrose ester emulsifier with an HLB number in the range of 15 to 16 and in an amount of up to 1% by weight of the dough mixture and polyvinylpyrrolidone synthetic hydrocolloid in an amount comprising 0.5% to 2.0% by weight of the dough mixture.

2. The method of claim 1 wherein the sucrose ester emulsifier comprises a sucrose stearate fatty ester emulsifier.

3. The method of claim 1 wherein the water activity of the dough mixture is adjusted to be within the range of 0.70 to 0.95 by the incorporation of an alcohol selected from the group consisting of glycerol, sorbitol, maltitol and xylitol in the dough mixture.

4. A dough for use in the production of yeast leavened bread products comprising flour, water, shortening, an alcohol selected from the group consisting of glycerol, sorbitol, maltitol and xylitol, yeast, salt, a sucrose ester emulsifier with an HLB number in the range of 15 to 16 and polyvinylpyrrolidone synthetic hydrocolloid in an amount in the range of 0.5%–2% by weight of the mixture.

5. The dough mixture of claim 4 wherein the amount of the alcohol is selected to cause the water activity of the mixture to be within the range of 0.70–0.95.

6. The dough mixture of claim 5 wherein the hydrocolloid has molecular weight of at least 300,000.

* * * * *